Feb. 12, 1924.  
J. S. NICOL  
1,483,742  
METHOD AND MEANS FOR THE TREATMENT OF FATS AND OILS  
Filed Jan. 12, 1922 3 Sheets-Sheet 1

WITNESSES

INVENTOR  
JOHN STEVENS NICOL  
BY  
ATTORNEYS

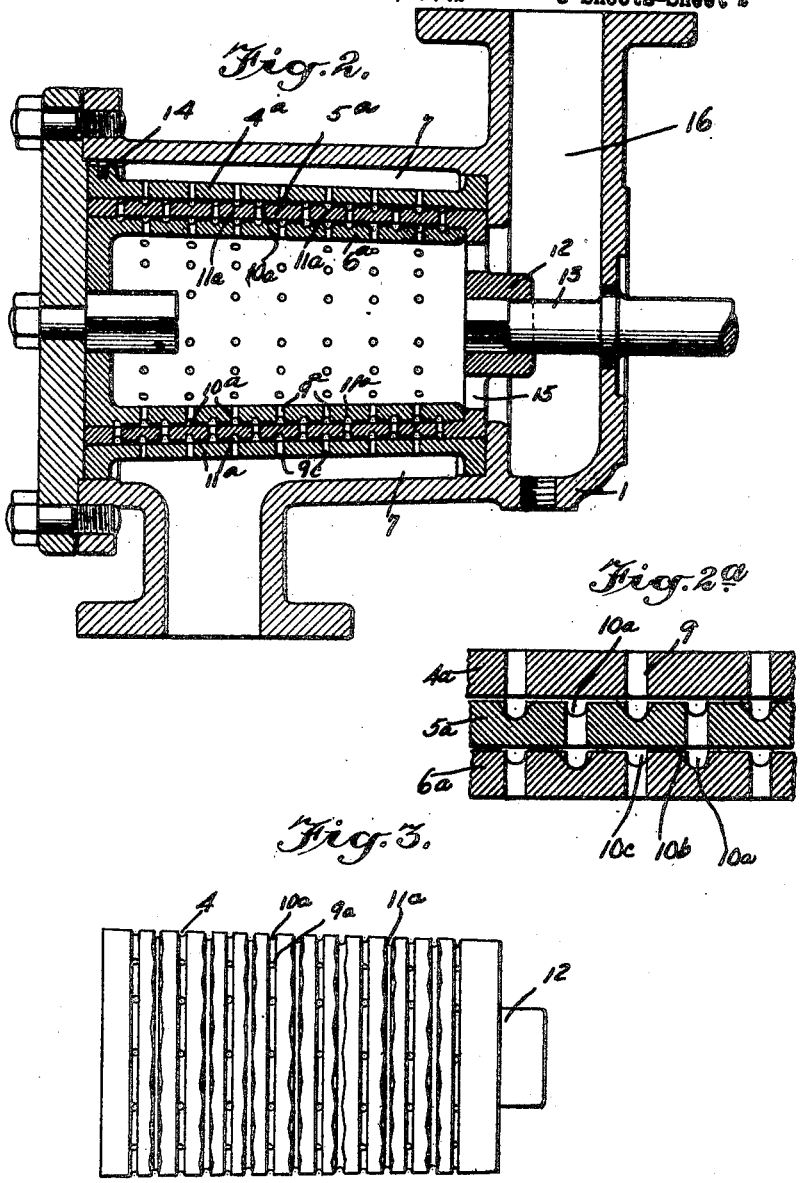

Feb. 12, 1924. 1,483,742
J. S. NICOL
METHOD AND MEANS FOR THE TREATMENT OF FATS AND OILS
Filed Jan. 12, 1922   3 Sheets-Sheet 3
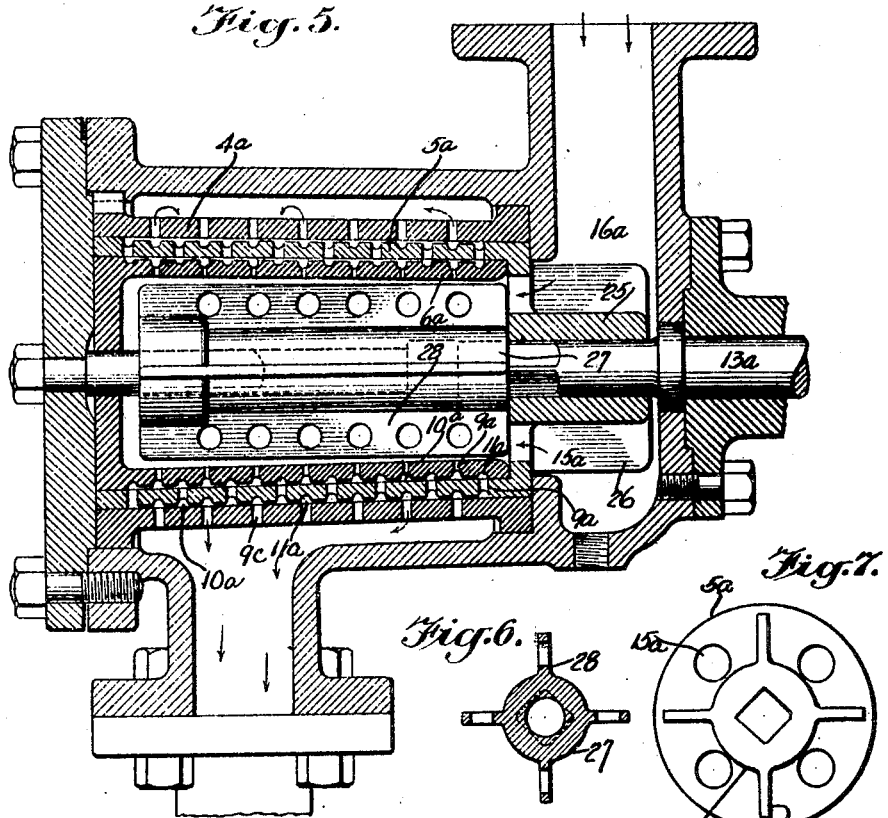
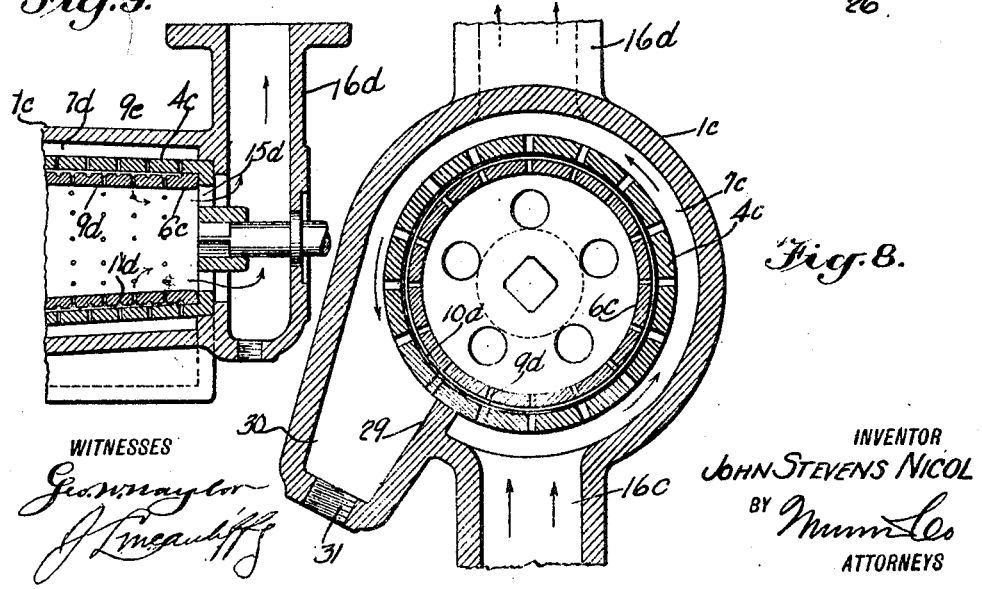
INVENTOR
John Stevens Nicol
BY
ATTORNEYS Patented Feb. 12, 1924.

1,483,742

UNITED STATES PATENT OFFICE.

JOHN STEVENS NICOL, OF PUTNEY, LONDON, ENGLAND, ASSIGNOR TO WILLIAM DOUGLAS & SONS, LIMITED, OF LONDON, ENGLAND.

METHOD AND MEANS FOR THE TREATMENT OF FATS AND OILS.

Application filed January 12, 1922. Serial No. 528,754.

*To all whom it may concern:*

Be it known that I, JOHN STEVENS NICOL, a subject of the King of Great Britain, and a resident of Putney, S. W. 15, London, England, have invented a new and Improved Method and Means for the Treatment of Fats and Oils, of which the following is a description.

This invention has reference to the treatment of edible fats, such as lard, lard compounds, or similar fats, and is available for emulsifying oils as in the manufacture of margarine as well as for the treatment of crude oil used in furnaces, the invention in the case of the fats referred to serving to improve the color, grain and texture of such substances and having a characteristic action on oils in emulsifying the same and on the fuel oil as will appear.

In the common method of treating fats they are spread whilst in a liquid condition in the form of a film over the surface of a rotating brine cooled cylinder and are stripped therefrom by means of a knife and allowed to fall into a "picker trough" in which they are broken up by rotating beaters or blades co-operating with a stationary comb, after which they are forced by means of a pump through a strainer comprising two or more perforated plates. This method is not entirely satisfactory, since it is not possible thereby to obtain a product which is uniform in grain and color this being by reason of the fact that all lumps of fat which show as yellow or greenish yellow spots or patches in the product, cannot be eliminated.

In accordance with the invention I subject the edible fats to a combined straining and a rubbing or "dishing" action thereby eliminating all lumps and obtaining a product which is uniformly white in color and smooth and silky in texture. Oils are similarly treated as will appear.

The apparatus employed in carrying out my invention and forming part thereof comprises two or more cylinders fitted within one another with an annular space between them, each of the cylinders being provided with a number of perforations, and one or more of the cylinders having a number of circumferential grooves with some of which the said perforations communicate, the arrangement being such that the material which is forced through the perforations in the outer cylinder is constrained to travel in a tortuous or zigzag path to the interior of the inner cylinder, for which purpose the perforations in each cylinder may be staggered relatively to those in the subsequent cylinder or cylinders. Some of the said grooves serve to collect and retain dirt or other foreign matter, whilst to assist the passage of the material and prevent the clogging of the annular space between the cylinders, the said dirt collecting grooves may have their edges serrated.

The aforesaid concentric cylinders are located in a suitable casing or housing between the inner surfaces of which and the outer face of the outer cylinder is an annular space into which the material is supplied under pressure. Advantageously, three of such concentric cylinders may be provided, the material passing through the perforations in the outer cylinder into the grooves with which said perforations communicate, and from thence passing longitudinally of the cylinders through the narrow space between the cylinders to the grooves with which the perforations in the adjacent cylinder communicate.

In a similar manner the material will pass through the walls of the second and third cylinders to the interior of the latter, and be discharged through an orifice, or orifices, in one end thereof, all lumps being broken up and the material reduced to a uniform smooth texture and white color during the tortuous passage through the several perforation grooves and passages, in and between the cylinders.

I find that the character of the product is greatly improved if one or more of the cylinders is rotated relatively to the other or others during the straining operation, this being due to the increased rubbing or "dishing" action on the material as it passes between a stationary and a moving surface or between the differentially moving surfaces. In the preferred construction therefore I provide means for rotating one of the said cylinders. If two concentric cylinders be employed preferably the inner cylinder is rotated. If three cylinders are employed the inner cylinder may be rotated and the outer cylinder rigidly secured in the casing while the central cylinder may be fixed or may be loosely mounted so as to be rotatable by friction, or, if desired, the said central cylinder may be positively driven, as for example, by sun and planet gearing from the inner cylinder, and the outer cylinder held stationary and the central cylinder rotated.

The material discharged from the strainer may pass through a suitable pipe or conduit and may be delivered under the control of a cock to any desired receptacle. There is also preferably connected with the strainer casing a by-pass controlled by a cock which is so connected with the delivery cock that when the latter is closed the by-pass cock is open, and the material instead of passing through the concentric cylinders as above described passes from the annular space between the outer cylinder and the wall of the enclosing casing back to the pump. When, however, the delivery cock is open the by-pass cock is closed, and the material is strained and treated as above described.

In order that the invention may be clearly understood and readily carried into effect I will now proceed to describe the same more fully, with reference to the accompanying drawings, in which—

Figure 2 is a vertical section of another constructional form of the invention in which the central cylinder is adapted to be rotated;

Figure 2a is a fragmentary longitudinal section through the cylinders of Figure 2 at one side and indicating the serrations at the sides of certain grooves.

Figure 3 is a side view of one of the cylinders, the view being given to show the forms of the grooves in certain of the cylinders;

Figure 5 is a view similar to Figures 1 and 2 but illustrating the apparatus equipped with mixing paddles to be hereinafter referred to and especially advantageous in emulsifying;

Figure 6 is a vertical section of the paddle applied to the drive shaft within the inner cylinder;

Figure 7 is an end view of the paddle applied to the shaft adjacent to the inlet to the cylinders;

Figure 8 is a transverse vertical section illustrating the cylinder arrangement and scraper especially useful in treating crude oil for use in firing steam boilers on ships, etc.;

Figure 9 is a fragmentary side elevation of the arrangement of Figure 8.

Figure 1:
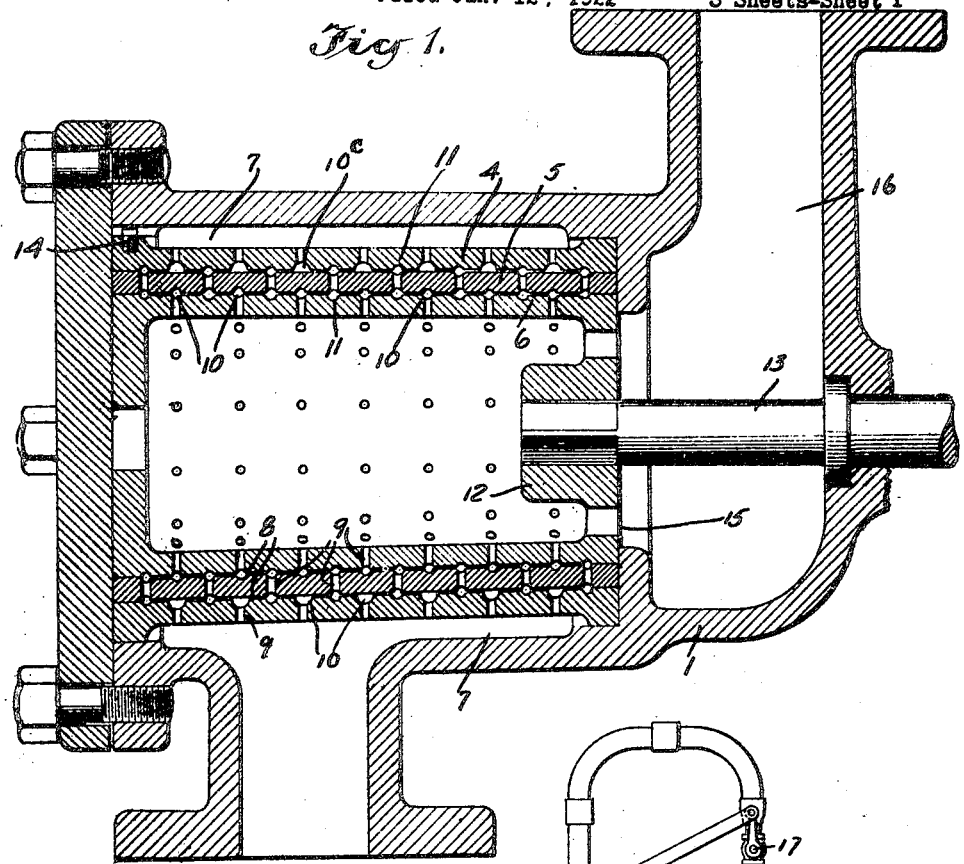
Figure 1 is a vertical section illustrating one form of the invention in which the inner of three concentric cylinders is adapted to be rotated.

The numeral 1 indicates the housing or casing of the strainer into which the lard compound or the like coming from the picker-trough 2 (Figure 4) is forced by the pump 3. Located in the said housing 1 are three cylinders or drums 4, 5, and 6, an annular space 7 being left between the outer cylinder 4 and the inner surface of the housing 1, while between the several cylinders is an annular space 8, provided, in the form illustrated in the drawings, by recessing the exterior surfaces of the cylinders 5 and 6. Each of the cylinders is provided with a number of perforations or substantially radial borings 9, the perforations in each cylinder being staggered relatively to those in the adjacent cylinder.

In the constructional form illustrated in Figure 1 each of the cylinders is provided with a plurality of circumferential grooves, of which the grooves 10 of the cylinders 4 and 5 and the corresponding, but slightly larger, grooves 10c in the outer cylinder with which the perforations 9 of the respective cylinders communicate, serve both as distributing and dirt-collecting grooves, while the alternating grooves 11 serve as distributing grooves. As will be obvious from the drawing the material which is forced by the pump 3 into the annular space 7 will pass through the perforations 9 and annular passages 8 in a tortuous or zig-zag path during which it will be subjected to a rubbing or dishing action. In the form shown in Figure 1 the inner cylinder 6 is adapted to be rotated for which purpose one end thereof is provided with a boss 12 to receive the square end of a shaft 13 which may be driven from any suitable or convenient source of power, the outer cylinder 4 being held stationary by the screws 14, and the intermediate cylinder either being also stationary or being loosely mounted so as to be rotatable by friction.

In the construction illustrated in Figure 2 no grooves are formed in the outer cylinder 4a, but distributing and collecting grooves 10a are formed in each of the cylinders 5a, 6a to communicate with the radial holes 9a 9c in the respective cylinders, said grooves having their edges serrated as shown at 10b, the grooves 10a in acting as dirt collectors retain large particles of the dirt but by reason of the motion of the cylinders and the said serrated edges of the grooves, smaller particles of dirt are broken off and escape with the fat or the like, thus preventing clogging of the grooves. In this form of the invention the intermediate cylinder 5a is adapted to be rotated, the outer cylinder being held stationary as before, while the inner cylinder 6ᵃ is either stationary or is rotatable by friction, or if desired suitable gearing such as sun and planet gearing may be provided whereby the cylinder 6ᵃ may be positively driven.

As will be seen from the drawings each of the cylinders, 4, 5, 6 and 4ᵃ, 5ᵃ, 6ᵃ, is tapered slightly to facilitate removal thereof for cleaning purposes.

Figure 4:
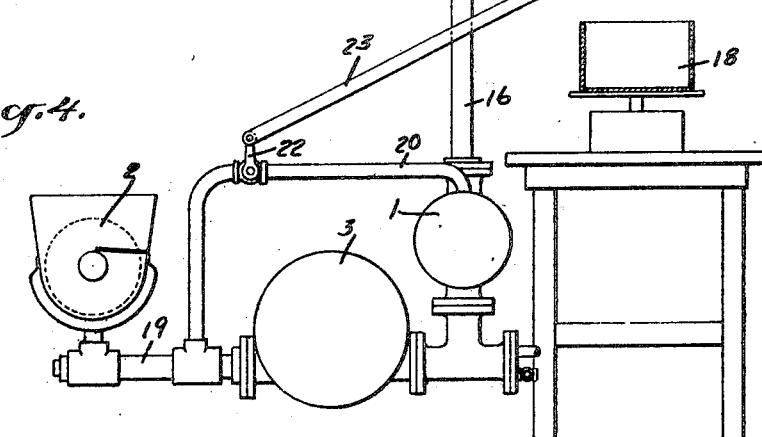
Figure 4 is a diagrammatic view of the general arrangement of the plant for treating edible fats in accordance with the invention.

The material which, after passing through the several perforations, grooves and spaces as described, after it has reached the interior of the inner cylinder 6 or 6ᵃ finds its exit through the passage 15 into the conduit 16 from which it may be discharged under the control of the cock 17 into a receptacle 18 (see Figure 4). Connecting the annular space 7 in the housing 1 with the conduit 19 is a by-pass pipe 20 controlled by a cock 21 the actuating member 22 of which is connected by a lever 23 with the cock 17 in such a manner that when the cock 17 is closed the cock 21 is opened and vice versa.

By this arrangement when the delivery cock 17 is closed the material delivered by the pump 3 to the annular space 7 instead of passing through the strainer returns by the pipe 20 to the pump.

In the production of emulsions in accordance with my invention, the oil or oils and an emulsifying agent are given preliminary agitation and mixing and subsequently subjected to a further agitation and mixing, whereby the oils are partially broken down and a closer mixing obtained before being subjected to the rubbing or "dishing" and straining action, the complete operations serving to bring the material into a finely divided state and to a condition to complete mulsification. For the stated purpose I provide on the shaft 13ᵃ in the inlet 16ᵃ an agitator 25 having radial blades 26. Also, sleeved on said shaft 13ᵃ, within the inner cylinder, is an elongated agitator and mixer 27 having radial blades 28. The liquids to be mulsified are supplied under pressure by suitable pumps (not known) to the inlet 16ᵃ which constitutes a mixing chamber, the blades 26 acting in opposition to the force of the pumps serving to effect a mixing action. From the mixing chamber 16ᵃ the mixture is admitted through inlet holes 15ᵃ in the end of the intermediate cylinder 5ᵃ to the interior of the inner cylinder 6ᵃ, the cylinder arrangement illustrated in Figure 5 advantageously corresponding with that of Figure 2. Within the inner cylinder before passing radially outward through the latter the mixture is subjected to a second agitating and mixing by the agitator 27 and its blades 28.

The invention is particularly applicable to the straining of oil such as crude oil used in fire furnaces because a portion of the foreign matter contained in the oil is retained on the exterior surface of the outermost concentric cylinders and may be removed therefrom by a scraper 29, Figure 8, here shown as integral with a side wall of a well 30 having a blow-out hole 31, said well being formed integral with the casing 1ᶜ which in this form of the invention advantageously has the inlet 16ᶜ at the bottom at one side of the scraper 29, so that the oil will be required to travel about substantially for the complete circumference of the casing in the annular space 7ᶜ between said casing and the outer cylinder 4ᶜ. An inner cylinder 6ᶜ is employed, two cylinders completing the assemblage on the preferred form for treating crude oil. Said inner cylinder has external annular collecting and distributing grooves 10ᵈ and distributing grooves 11ᵈ as well as radial holes 9ᵈ. Outer cylinder 4ᶜ has radial holes 9ᵉ and the cylinders otherwise conform generally with the groove arrangement at the exterior of the cylinders 6 and 6ᵃ. Any particles in the crude oil which do not escape or is not deposited on the exterior surface of the outer cylinder or in the annular grooves are reduced by the grinding action of the cylinders in the space therebetween and brought to such a finely divided condition that they will not be detrimental inasmuch as they will pass through the burners with which oil-fire furnaces are usually provided and without any tendency to clog the burners. The oil is fed to the space 7ᵈ within the casing 1ᶜ by inlet 16ᶜ and discharged from the outlet orifices 15ᵈ and discharge neck 16ᵈ.

I would state in conclusion that while the illustrated example constitutes a practical embodiment of my invention, I do not limit myself strictly to the mechanical details herein illustrated, since, manifestly, the same can be considerably varied without departure from the spirit of the invention as defined in the appended claims.

Having thus described my invention, I claim:

1. In a method of treating fats or oils, forcing the same through successive transverse openings in differentially moving elements in close juxtapositions.

2. In a method of treating fats or oils, forcing the same through the walls of successive perforated cylinder one within the other while rotating one cylinder relatively to the other and while maintaining said cylinders in rubbing relation one to the other.

3. In a method of treating fats or oils, forcing the same through the walls of successive openings in differentially moving cylinders disposed one within another with their faces rubbing against each other.

4. In a method of treating fats or oils, forcing the same in a tortuous path from the exterior of a hollow cylinder to the interior of another cylinder concentric therewith while rotating one of said cylinders relatively to the other.

5. An apparatus for treating fats or oils, comprising a plurality of cylinders, one within another, and presenting a narrow space therebetween, each of the cylinders being formed with perforations and there being circumferential grooves with which the respective perforations in the respective cylinders communicate, and means whereby the material is constrained to pass in a tortuous path through the aforesaid perforations, grooves, and spaces presented by the assembled cylinders.

6. An apparatus for treating fats or oils, comprising a plurality of cylinders one within another and presenting a narrow annular space therebetween, each of the cylinders being formed with perforations and there being annular grooves establishing communication between the perforations in the respective cylinders and the space between the cylinders.

7. An apparatus for treating, fats and oils, comprising a plurality of cylinders one within another and presenting a narrow annular space therebetween, each of the cylinders being formed with perforations and there being annular grooves establishing communication between the perforations in the respective cylinders and the space between the cylinders; together with means to cause a turning movement of a cylinder relatively to the adjacent cylinder.

8. An apparatus for treating fats or oils, including a plurality of cylinders one within another and formed with annular series of perforations, the perforations of the respective cylinders being staggered and there being a narrow space between the cylinders for the fat to enter and form a rubbing fill between the faces of the cylinders.

9. An apparatus for treating fats or oils, including a plurality of cylinders one within another and formed with annular series of perforations, the perforations of the respective cylinders being staggered and there being a narrow space between the cylinders, there being furthermore annular grooves establishing communication between the perforations of each series, as well as additional annular grooves at non-perforated zones of the cylinders.

10. An apparatus for treating fats or oils, including a plurality of cylinders one within another and formed with annular series of perforations, the perforations of the respective cylinders being staggered and there being a narrow space between the cylinders, there being furthermore annular grooves establishing communication between the perforations of each series, as well as additional annular grooves at non-perforated zones of the cylinders, the second-mentioned grooves having zig-zag sides.

11. An apparatus for treating fats or oils, including a plurality of cylinders one within another and formed with annular series of perforations, the perforations of the respective cylinders being staggered and there being a narrow space between the cylinders, there being furthermore annular grooves establishing communication between the perforations of each series, as well as additional annular grooves at non-perforated zones of the cylinders, the second mentioned grooves having zig-zag sides; together with means to impart a turning movement to one cylinder relatively to another.

12. An apparatus for the treatment of fats or oils, comprising substantially concentric juxtaposed relatively moving cylinders affording indirect passages for the material successively through the respective cylinders; and means to force the material through said passages, and walls.

13. In an apparatus for treating fats or oils, differentially-moving elements presenting openings in the walls for the passage therethrough of the material to be treated, the walls of said elements being closely juxtaposed so as to subject the material entering therebetween to a rubbing action, an agitator for exerting a paddling action on the material, and means to conduct the material from the agitator to said elements together with a second agitator between the first agitator, and said elements.

14. An apparatus for the treatment of fats or oils comprising means to subject the material to a straining and rubbing action, a pump to force material through the straining and rubbing means, and optionally operable means to bring said straining and rubbing means into circuit with the pump or to cut out said means and complete a pumping circuit independently thereof for returning the pumped material back to the pump.

15. In an apparatus for treating fats or oils, differentially moving elements presenting openings for the passage therethrough of the material to be treated, an agitator interiorly of said elements and independently thereof for exerting a paddling action on the material, and means to conduct the material from the agitator to said elements; together with a second agitator between the first agitator and said elements.

16. In an apparatus for treating fats or oils, cylinders one closely fitting within another and each presenting lateral openings for the passage therethrough of the material to be treated, means to turn one cylinder relatively to another, and an agitator within the inner cylinder.

17. In an apparatus for treating fats or oils, cylinders one within another presenting lateral openings for the passage therethrough of the material to be treated, means to turn one cylinder relatively to another, and a scraper adapted to remove the material from the outer surface of the outer cylinder.

18. In an apparatus for treating fats or oils, cylinders one within another presenting lateral openings for the passage therethrough of the material to be treated, means to turn one cylinder relatively to another, and a scraper adapted to remove the material from the outer surface of the outer cylinder; together with a casing outside of the outer cylinder and spaced therefrom, and an inlet to said space adjacent to said scraper.

19. In a method of treating fats or oils, forcing the same in a tortuous path from the interior of a hollow foraminous cylinder to the exterior of another foraminous cylinder juxtaposed thereto and approximately concentric therewith while rotating one of said cylinders relatively to the other.

JOHN STEVENS NICOL.